May 23, 1939.  L. H. MOULTHROP  2,159,041
ELECTRIC SOLDERING DEVICE
Filed July 22, 1936
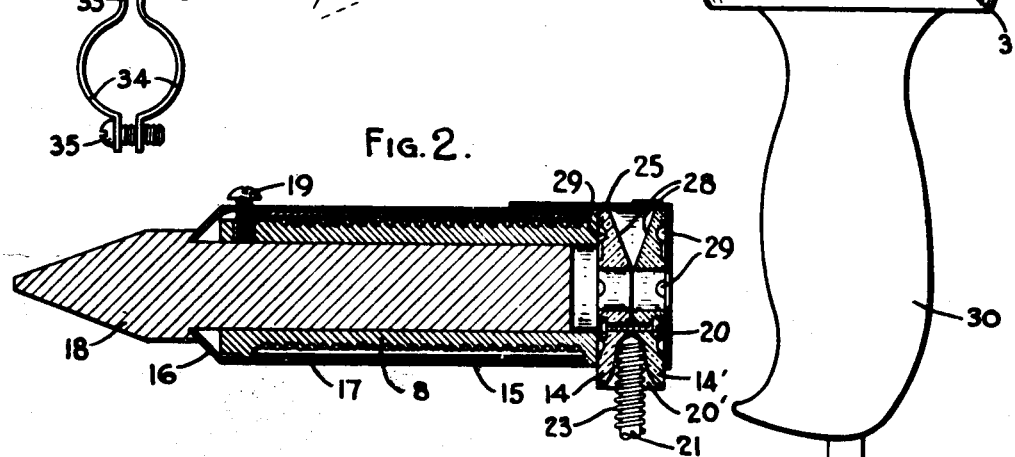
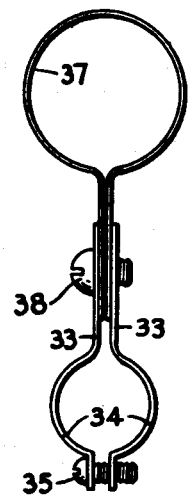
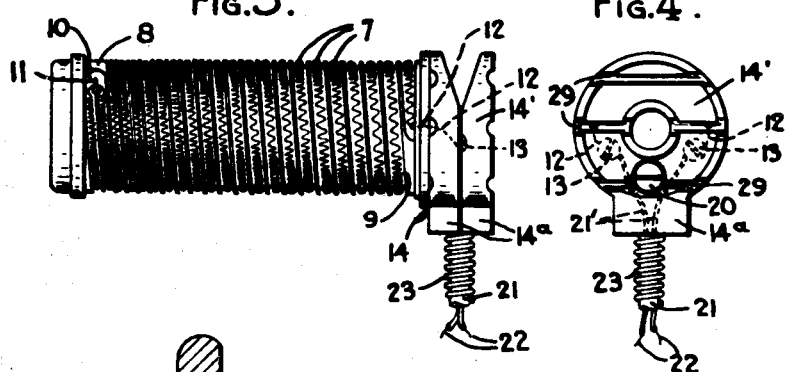
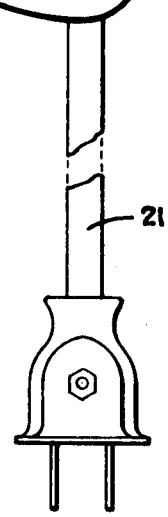
INVENTOR
L. H. Moulthrop
BY
John O. Seifert
ATTORNEY Patented May 23, 1939

2,159,041

UNITED STATES PATENT OFFICE 2,159,041

ELECTRIC SOLDERING DEVICE

Lembert H. Moulthrop, Bridgeport, Conn.

Application July 22, 1936, Serial No. 91,809

4 Claims. (Cl. 219—26)

This invention relates to electrically heated devices and particularly electrically heated soldering devices or irons, and it is an object of the invention to provide an improved construction and arrangement of heating element and tubular enclosing shell for the heating element and carrying the soldering bit extended through one end thereof into the heating element, whereby the soldering bit may be readily removed for the substitution of another bit without removing the heating element, and the heating element also may be quickly and readily removed from the enclosing shell therefor.

A further object of the invention is to provide improved means adapted to be carried by the shell for electrically connecting electric current conductors leading from a source of electric energy with the heating element and effect air cooling of said means and the electric connections between said conductors and the heating element.

It is another object of the invention to provide in combination with an electrically heating soldering device or iron a carrying and manipulating handle or hand grip and means to connect and support the soldering device from the hand grip to have angular adjustment relative to the hand grip to facilitate soldering points that could only be reached with difficulty otherwise, and wherein the soldering device may be automatically adjusted to different angular positions relative to and in a plane longitudinally of its hand grip supporting means, and whereby the weight of the soldering device or iron may be balanced relative to its supporting hand grip, not only facilitating soldering operations but also relieving the hand and arm of the user of the soldering device or iron of an unbalanced weight carried by the hand grip.

Other objects and advantages will hereinafter appear.

In the drawing accompanying and forming a part of this application,

Figure 1 is a side elevation showing an embodiment of my improved soldering device and means for adjustably supporting the same from a handle or hand grip.

Figure 2 is a longitudinal sectional view of the soldering device or iron.

Figure 3 is a side elevation of the heating element for the soldering bit.

Figure 4 is an end elevation looking at the left of Figure 3.

Figure 5 is a plan view of the means for connecting and supporting the soldering device or iron from a hand grip.

Figure 6 is a longitudinal sectional view of the hand grip.

In the embodiment of the soldering device or iron shown there is provided a heating element comprising a coiled strand of electric resistance wire 7 coiled about and carried upon the exterior of a tubular mounting member or body in the form of a spool 8 of electric insulating and non-oxidizing material. The mounting member or spool 8 is provided with two spiral grooves 9 in the exterior surface, the grooves commencing at a recess 10 at one end of the member and the pitch of the successive convolutions of the grooves progressively increased from said end of the mounting member to the opposite end thereof. In mounting the resistance element 7 upon the member 8 the resistance wire is folded upon itself intermediate its ends and attached at the fold to the mounting member 8 by engaging the same upon a hook in the recess 10, as shown at 11, and the opposite end portions of the resistance wire coiled about and engaged in said grooves, the terminal portions of the resistance wire being extended through openings in a head of the mounting member, as shown in dotted lines at 12 and electrically connected to conductor members in the form of binding screws 13 carried by a body of electric insulating and heat resisting material comprising a pair of sections 14, 14' the construction, arrangement and function of which will be hereinafter described.

The member or spool 8 carrying the electric resistance element is engaged in a tubular enclosing casing or shell 15 one end portion of which shell is arranged to converge inwardly and provided with an opening of a diameter less than the diameter of the body of the shell, as at 16, the length of said shell relative to the length of the tubular member or spool 8 being such that the one end of the spool terminates at the juncture of the converging end with the body of the shell and the opposite end or head of the spool extending from the shell and being of a diameter substantially equal to the outer diameter of the shell and the end of the shell abutting said head, as clearly shown in Figure 2. An electric and heat insulating material is interposed between the heating element and the shell, and shown as sheet mica 17 wrapped around the resistance element and extending between the heads of the tubular member or spool 8. A soldering bit 18 of suitable material, such as copper, is carried by the shell within the tubular member or spool 8, and as shown is provided with a head having a shank of reduced diameter or cross sectional dimension relative to the head, the shank being extended through the opening in the diverging end of the shell into the spool 8 and secured therein by a set screw 19 threaded into an opening in the shell 15 and extended through an opening in the tubular member or spool 8 to abut the shank of the bit, as clearly shown in Figure 2, the shoulder at the juncture of the shank with the head of the bit being preferably arranged at an angle corresponding to the inclination of the diverging end of the shell.

To electrically insulate the connections of the conductors 13 and the terminals of the resistance element 7 and effect heat insulation of the heating element at the end of the shell opposite the soldering bit, the means comprising the pair of mating sections 14, 14' of suitable material is provided, an asbestos composition commercially known as transite having been found suitable for the purpose. The sections 14, 14' are connected together by a screw bolt 20 the head of the bolt and the nut being countersunk into the material of the sections 14, 14'. Each of the sections 14, 14' includes a circular body portion having an opening centrally therethrough and a laterally extending portion 14a the mating faces of which portions are arranged when the sections are connected to provide a recess 20' between the same, as shown in Figure 2, for the engagement of the end of an insulating carrying cable 21 for conductors 22 adapted for connection with or leading from a source of electric energy, and a guard 23 on said cable, with passages leading from said recess between the sections 14, 14' to the conductors 13 for the engagement of the conductors 22 that are electrically connected with the conductors 13, as shown in dotted lines 22' in Figures 4, the conductors or binding screws 13 being threaded into the section 14. To connect the terminals of the resistance element 7 with the conductors 13 they are extended through openings in the section 14 in line with the openings in the head of the spool 8, as shown at 12 in Figure 4.

To support the sections 14, 14' in contiguous relation to the end of the tubular member or spool 8 opposite the soldering bit the connected sections are engaged in a cap 25, the skirt or side wall of said cap having a portion cut away or removed, as at 26 in Figure 1, for the passage of the laterally extending portions 14a, the cap being adapted to be engaged on the end of the tubular shell 15 and releasably retained thereon by nibs 27 pressed inwardly from the skirt of the cap engaging in correspondingly formed recesses in the tubular shell. When the cap with the connected sections 14, 14' therein is engaged on the tubular shell 15 the central openings in said sections will be in axial alinement with the opening or bore in the tubular member or spool 8 and adapted for the entering of an implement therein to engage and move the soldering bit, after the release of the screw 19, from the tubular member or spool 8 and the tubular shell 15.

To permit of radiation of the heat from and effect cooling of the end of the soldering device to which the cap is connected a portion of the sections 14, 14' at the mating faces is cut away to provide a space between said faces, as at 28 in Figure 2, and transverse recesses 29 are arranged in the outer faces of said sections opening through the side of the body portion thereof and which recesses in conjunction with the end of the cap and end of the tubular member or spool 8 form passages for the circulation of air, as shown in Figure 2.

To manipulate the soldering device or iron there is provided a support therefor, shown in the form of a handle or hand grip 30 of suitable material, such as wood, or a molded material, such as vulcanite, condensite or Bakelite and the like, shaped in transverse and longitudinal section to fit a closed hand to which the soldering device is connected and supported to extend in angular relation to the axis thereof and to have adjustment to different angular positions relative to the hand grip. For this purpose the hand grip is provided with a bore 31 extended longitudinally therethrough and through which bore the conductor carrying cable 21 is extended, and the guard 23 being of a length to extend into said bore 31 of the hand grip and adapted to have longitudinal sliding movement therein as the soldering device is adjusted to different angular positions relative to the hand grip. The hand grip at the one end is also provided with an annular enlargement 32 to serve as shield to deflect the heat radiated from the soldering device from the hand grip and hand of the user gripping the hand grip. One of the positions to which the soldering device may be adjusted is shown in dotted lines in Figure 1, and it will be obvious that it may be adjusted to extend from the full line position opposite to that shown in dotted lines, and whereby the soldering device is adapted to facilitate the soldering of points that could otherwise be reached only with difficulty.

The means to adjustably connect and support the soldering device from the hand grip comprises a bracket or clamp member shown as constructed of a pair of plates 33 of like but opposite hand and each arranged with an arcuate portion 34 adjacent one end and adapted to be arranged in opposed relation when the plates are juxtaposed one relative to the other, as shown in Figure 5. The plates are secured together by a screw 35 extended through an opening in an ear of one plate outward from the arcuate portion and threaded into an opening in a corresponding portion extended outward from the other arcuate portion of the other plate. The clamp member is mounted or secured on the end of the hand grip by engaging the arcuate portions 34 upon a reduced portion 36 extending outwardly from the shield 32 of the hand grip with a portion of the plates extending laterally from the hand grip. The reduced portion 36 may constitute a part of the hand grip, but as shown comprises a separate tubular member of heat resisting material similar to the body 14, 14', and may be made of an asbestos composition commercially known as transite, said member being mounted in a recess axially in the end of the hand grip and constituting an enlargement of the bore therein. To support the soldering device from the hand grip there is provided a member 37, comprising, as shown in Figure 5, a plate 37 formed to circular form midway the ends and the opposite end portions to extend parallelly of and juxtaposed to each other, said member being mounted on the soldering device by engaging the circular portion on the soldering device to embrace the soldering device intermediate the ends thereof with the juxtaposed end portions extending laterally from the soldering device, as shown in Figure 1; and permit of longitudinal adjustment of the soldering device in the circular portion. The members 33, 37 are pivotally connected together by engaging the juxtaposed ends of the member 37 between the plates 33 and clamping the same together by a screw 38 extended through an opening in one of the plates 33 and openings in the juxtaposed ends of the member 37 and threaded into an opening in the other plate 33 and the plates drawn together by the screw to permit of movement of the juxtaposed ends of the member 37 between the plates 33 and frictionally hold the same in adjusted position. By the arrangement described it will be obvious that the soldering device is supported at the end of the hand grip and, may be adjusted with the member 37 in the plane of the axis of the hand grip about the screw 38 on an axis extending transversely of the axis of the hand grip, and by the engagement of the arcuate portions 34 of the plates 33 on the part 36 of the hand grip the soldering device may be adjusted about the longitudinal axis of the hand grip. By the arrangement of the means 33, 37 to connect the soldering device with the hand grip not only is the soldering of points facilitated that can only be reached with difficulty, but there is assured a perfect balance of the load or weight of the soldering device from the hand grip with the result that the hand and arm of the user of the soldering device will not become tired and the soldering operation may be continued for a longer period of time without rest. Also by the arrangement of extending the conductor carrying cable 21 through the longitudinal bore in the hand grip said cable is conveniently positioned for manipulating the soldering device. By the arrangement of engaging the soldering bit in the tubular member or spool 8 carrying the electric resistance element and constructing said member 8 of a non-metallic material there is no possibility of the soldering bit becoming frozen within the heating element due to expansion of the soldering bit by subjecting the same to the heat, and by the arrangement of the openings in the member 14, 14' and cap 25 axially of the bore in the tubular member or spool 8 the removing of the soldering bit is greatly facilitated by an implement which may be engaged in said openings engaging the end of the soldering bit.

Having described my invention, I claim:

1. A soldering device including a tubular shell enclosing and carrying a tubular electric heating element and a soldering bit in the heating element extended through one end of the shell and exposed through the opening in the opposite end of the shell and heating element, a hand grip, and a pair of pivotally connected members, one of said members being mounted on the hand grip and the other member embracing the shell of the soldering device intermediate the ends thereof and permitting the longitudinal adjustment of said shell, and said latter member adapted to have adjustment on its pivotal connection with the first member on an axis extending transversely of the axis of the hand grip to position the soldering bit into different angular positions relative to the hand grip.

2. A soldering device including a tubular shell enclosing and carrying a tubular electric heating element and a soldering bit in the heating element extended through one end of the shell and exposed through the opening in the opposite end of the shell and heating element, a hand grip, and means to connect the soldering device to one end of the hand grip to have adjustment about the longitudinal axis of the hand grip and to different angular positions relative to the hand grip on an axis extending transversely of the longitudinal axis of the hand grip and permit removal of the soldering bit from the shell and heating element without dismounting the soldering device from the hand grip.

3. A soldering device including a tubular shell enclosing and carrying a tubular electric heating element and a soldering bit in the heating element extended through one end of the shell and exposed through the opening in the opposite end of the shell and heating element, a hand grip having a bore extended longitudinally therethrough adapted for the passage of a cable carrying electric conductors connected to the heating element of the soldering device, a guard embracing the conductor carrying cable engaged at one end in a recess in the shell and slidable in the bore of the hand grip, a member embracing the shell, a member mounted on the end of the hand grip to have adjustment about the longitudinal axis of the hand grip, and means to pivotally connect said members and support the soldering device from the hand grip to have adjustment to different angular positions relative to the hand grip.

4. A soldering device including a tubular shell enclosing and carrying a heating element and a soldering bit, a hand grip having a reduced circular portion at one end, a bracket for adjustably mounting the soldering device on the hand grip comprising a pair of members, one of said members being of one piece and formed to circular shape with the opposite end portions straight and extended in the same direction from the circular portion, the circular portion of said member being engaged on the tubular shell, and the other member of the bracket being of circular shape at one end to encircle the reduced circular portion of the hand grip and having straight portions at the opposite end extending laterally from the reduced circular portion of the hand grip, and means adapted to adjustably engage the straight portions of both bracket members to pivotally connect said members and apply tension to the circular portions of the bracket members, whereby the soldering device has longitudinal adjustment relative to the bracket and adjustment to different angular positions relative to the hand grip, and the bracket and soldering device have rotary adjustment about the hand grip.

LEMBERT H. MOULTHROP.